(12) United States Patent
Carolan

(10) Patent No.: US 6,979,972 B2
(45) Date of Patent: Dec. 27, 2005

(54) METHOD AND APPARATUS FOR DETECTING A STALLED STEPPER MOTOR

(75) Inventor: Kevin M. Carolan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/749,290

(22) Filed: Dec. 30, 2003

(65) Prior Publication Data

US 2005/0140327 A1 Jun. 30, 2005

(51) Int. Cl.[7] .................. G05B 19/40; G05B 8/00; G05B 8/12; G05B 8/34
(52) U.S. Cl. ............... 318/696; 318/685; 318/565; 318/430; 318/431; 318/434; 318/445; 318/461
(58) Field of Search ............... 318/685, 696, 318/565, 430, 431, 434, 445, 461, 456

(56) References Cited

U.S. PATENT DOCUMENTS

| | | | |
|---|---|---|---|
| 3,898,576 A * | 8/1975 | Fukaya ................. 330/259 |
| 4,303,871 A * | 12/1981 | Berry .................. 318/138 |
| 4,347,465 A * | 8/1982 | Goertler et al. ........ 318/266 |
| 4,514,667 A * | 4/1985 | Sakmann et al. ........ 318/254 |
| 4,520,302 A * | 5/1985 | Hill et al. ............ 318/696 |
| 4,609,868 A * | 9/1986 | Ferrari ................ 324/772 |
| 4,625,667 A * | 12/1986 | Hammermann ........... 112/456 |
| 4,772,840 A * | 9/1988 | Taghezout ............. 318/696 |
| 5,012,168 A * | 4/1991 | Dara et al. ........... 318/434 |
| 5,457,364 A * | 10/1995 | Bilotti et al. ........ 318/434 |
| 5,485,070 A * | 1/1996 | Tominaga ............. 318/696 |
| 5,539,290 A * | 7/1996 | Lu et al. ............. 318/565 |
| 5,689,162 A * | 11/1997 | Li .................... 318/599 |
| 5,786,681 A * | 7/1998 | Kalpathi ............. 318/701 |
| 5,973,469 A * | 10/1999 | Higuchi et al. ....... 318/623 |
| 6,150,789 A * | 11/2000 | Pulford, Jr. ......... 318/685 |
| 6,239,564 B1 * | 5/2001 | Boe et al. ........... 318/254 |
| 6,265,891 B1 * | 7/2001 | Yamada et al. ........ 324/772 |
| 6,608,462 B2 * | 8/2003 | Slater et al. ........ 318/701 |
| 6,667,595 B2 * | 12/2003 | Wiseman ............. 318/696 |
| 6,794,775 B2 * | 9/2004 | Ellerthorpe et al. ... 310/68 B |
| 6,815,923 B2 * | 11/2004 | Forsey ............... 318/685 |
| 2002/0044197 A1 * | 4/2002 | Furumiya et al. ...... 347/247 |
| 2003/0218585 A1 * | 11/2003 | Hoshi et al. ......... 345/82 |
| 2004/0056661 A1 * | 3/2004 | Maeda et al. ......... 324/332 |

* cited by examiner

Primary Examiner—David Martin
Assistant Examiner—Elias B. Hiruy
(74) Attorney, Agent, or Firm—Fay, Sharpe, Fagan, Minnich & McKee, LLP

(57) ABSTRACT

A method for detecting a state of an electric motor includes: energizing the motor with electrical power such that an associated current applied to the electric motor rises over time toward a reference level; determining an amount of time that elapses between when the motor is energized and the reference level is reached; and, evaluating a state of the motor based upon the determined amount of time.

13 Claims, 3 Drawing Sheets

METHOD AND APPARATUS FOR DETECTING A STALLED STEPPER MOTOR

BACKGROUND

The present inventive subject matter relates to the art of electric motors. It is particularly applicable to stepper motors driven by chopping amplifiers, e.g., as are commonly implemented in printers, copiers, scanners, facsimile machines, xerographic devices, image reproduction and/or marking engines, etc., and it will be described with particular reference thereto. However, application is also found in connection with other devices and/or implementations.

In image reproduction and/or marking engines such as printers, copiers, scanners, facsimile machines, xerographic devices, etc., direct current (DC) electric motors, and in particular stepper motors, are commonly employed to carry out various motorized tasks, e.g., paper transporting, moving a print head, carriage assembly or other object, or other similar tasks. However, in certain instances the motor may malfunction or deviate from otherwise normal operation. For example, the motor may become stalled or stopped due to some physical obstruction or other impediment. Alternately, the load on the motor may vary from normal operating conditions, e.g., due to a failing or bad bearing, and hence the motor speed may vary from normal operating conditions. In such instances, diagnostic evaluation of the motor's operational state is often advantageous to determine where in fact the fault lies. Whether or not the motor is stalled and/or the motor's speed are of interest in diagnosing such problems.

In some instances, separate and/or independent detectors, e.g., an optical encoder or flag and sensor, are used to monitor the position and/or speed of the motor and/or the object being moved thereby. Such implementations however can be disadvantageous as the separate independent detectors present added production cost and/or other drawbacks that normally attend the use of additional components.

The present inventive subject matter contemplates a new and improved electric motor implementation and/or method for detecting an operational state of the of the same that overcomes the above-mentioned limitations and others.

SUMMARY

In accordance with one aspect, a method for detecting a state of an electric motor is provided. The method includes: energizing the motor with electrical power such that an associated current applied to the electric motor rises over time toward a reference level; determining an amount of time that elapses between when the motor is energized and the reference level is reached; and, evaluating a state of the motor based upon the determined amount of time.

In accordance with another aspect, a method for detecting an operational state of an electric motor includes: supplying electrical power to the motor, the electrical power having a current waveform and a voltage waveform, wherein in an initial rise time period that starts at a time the electrical power is supplied to the motor, the current waveform rises toward a reference level and the voltage waveform remains substantially steady, and in a chopping time period following the rise time period the voltage waveform is cycled on and off and the current waveform rises and falls accordingly; monitoring a waveform of the electrical power; and, determining an operational state of the motor from the monitoring of the waveform.

In accordance with yet another aspect, a motorization assembly includes: an electric motor; an amplifier that selectively supplies the motor with electric power to thereby drive the same, such that when the power is supplied an associated current is generated that rises over time toward a reference level; detection means for determining an amount of time that elapses between when electrical power is supplied and when the reference level is reached by the current; and, analyzing means for evaluating a state of the motor based on the determination of the detection means.

In accordance with still another aspect, a motorized system includes: an electric motor; an amplifier that selectively supplies the motor with electric power to thereby drive the same, such that when the power is supplied an associated current is generated that rises over time toward a reference level; detection means for monitoring the supplied electrical power; and, analyzing means for evaluating a state of the motor based on the monitoring of the detection means.

Numerous advantages and benefits of the present inventive subject matter will become apparent to those of ordinary skill in the art upon reading and understanding the present specification.

BRIEF DESCRIPTION OF THE DRAWINGS

The present invention may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements and/or components that are commonly known in the art and/or understood by those of ordinary skill without further detailed explanation as to their configuration or operation except to the extent they have been modified or altered in accordance with and/or to accommodate the preferred embodiment(s) presented herein.

Figure 1:
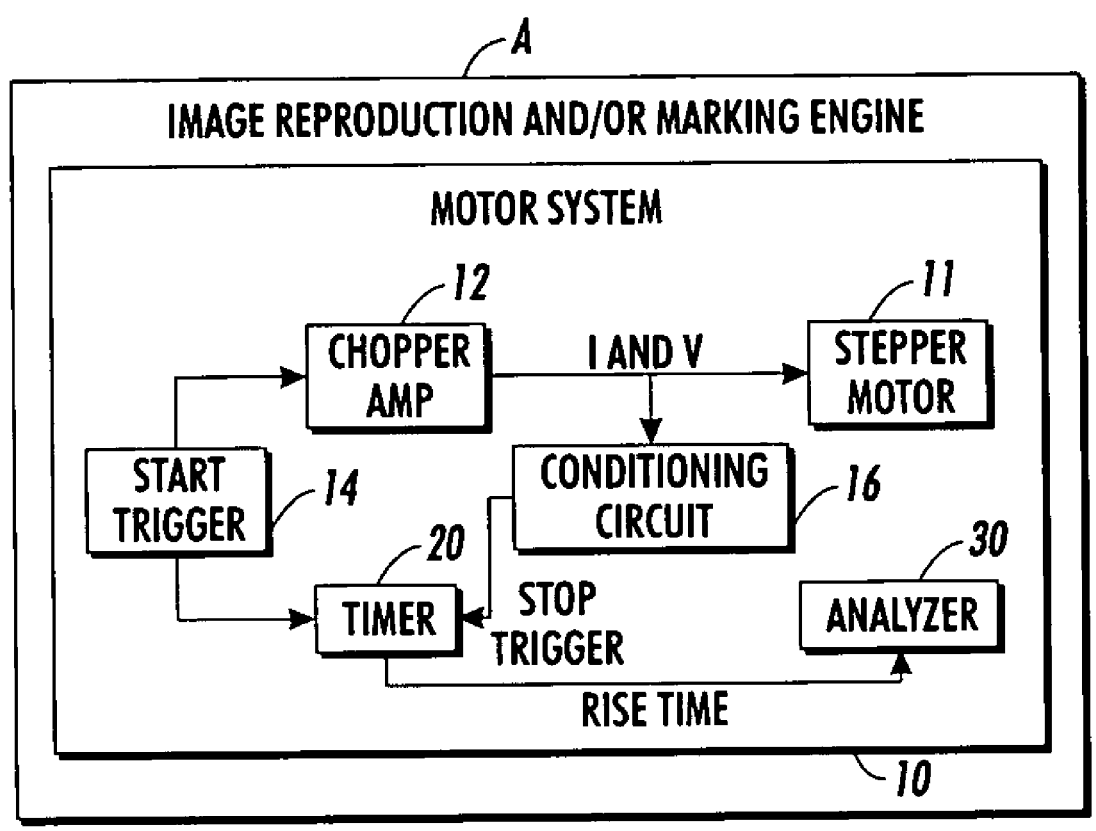
FIG. 1 is a diagrammatic illustration showing an exemplary image reproduction and/or marking engine incorporating a motorized system or assembly embodying aspects of the present inventive subject matter.
Figure 2:
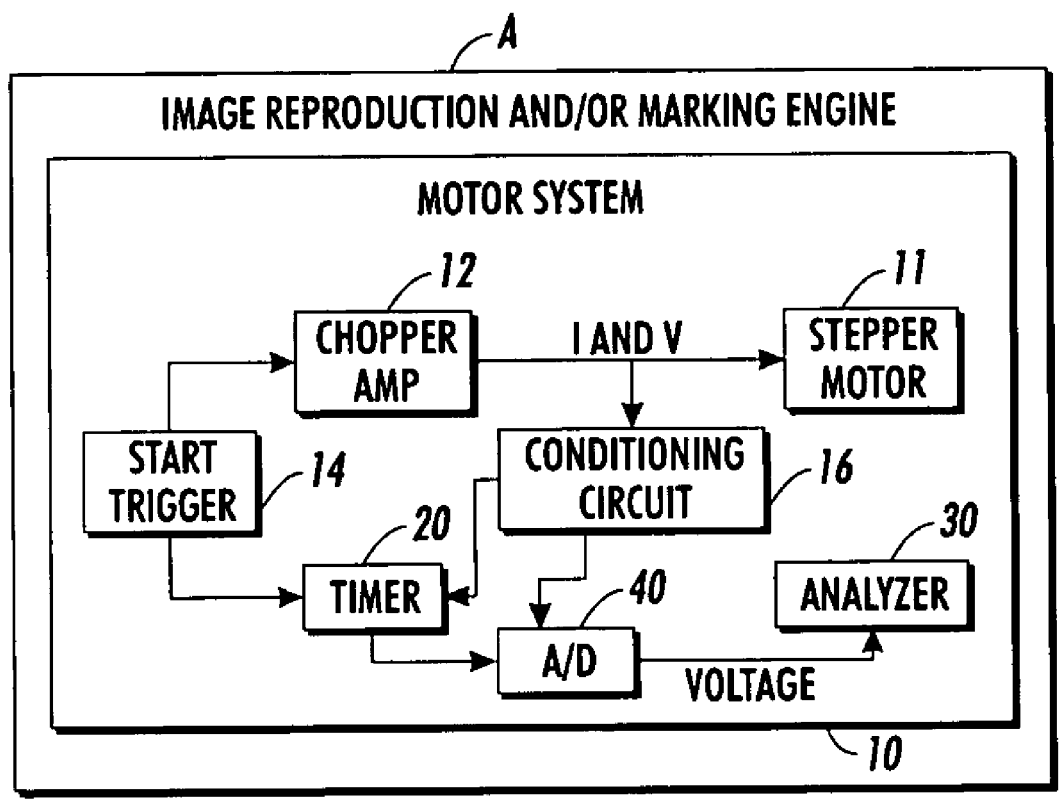
FIG. 2 is a diagrammatic illustration showing the exemplary image reproduction and/or marking engine incorporating yet another embodiment of the motorized system or assembly in accordance with aspects of the present inventive subject matter.

With reference to FIGS. 1–2, an image reproduction and/or marking engine A (e.g., a printer, copier, scanner, xerographic device, facsimile machine etc.) includes a motorized system or assembly 10 for transporting and/or moving a selected object, e.g., a print head, carriage assembly, paper, or other object. The system 10 includes a DC electric motor, suitably, a stepper motor 11. As shown, the stepper motor 11 is selective driven by a chopper amplifier 12 or other such suitable electric power source, e.g., at a step rate of around 2 kilohertz (KHz).

Figure 3:
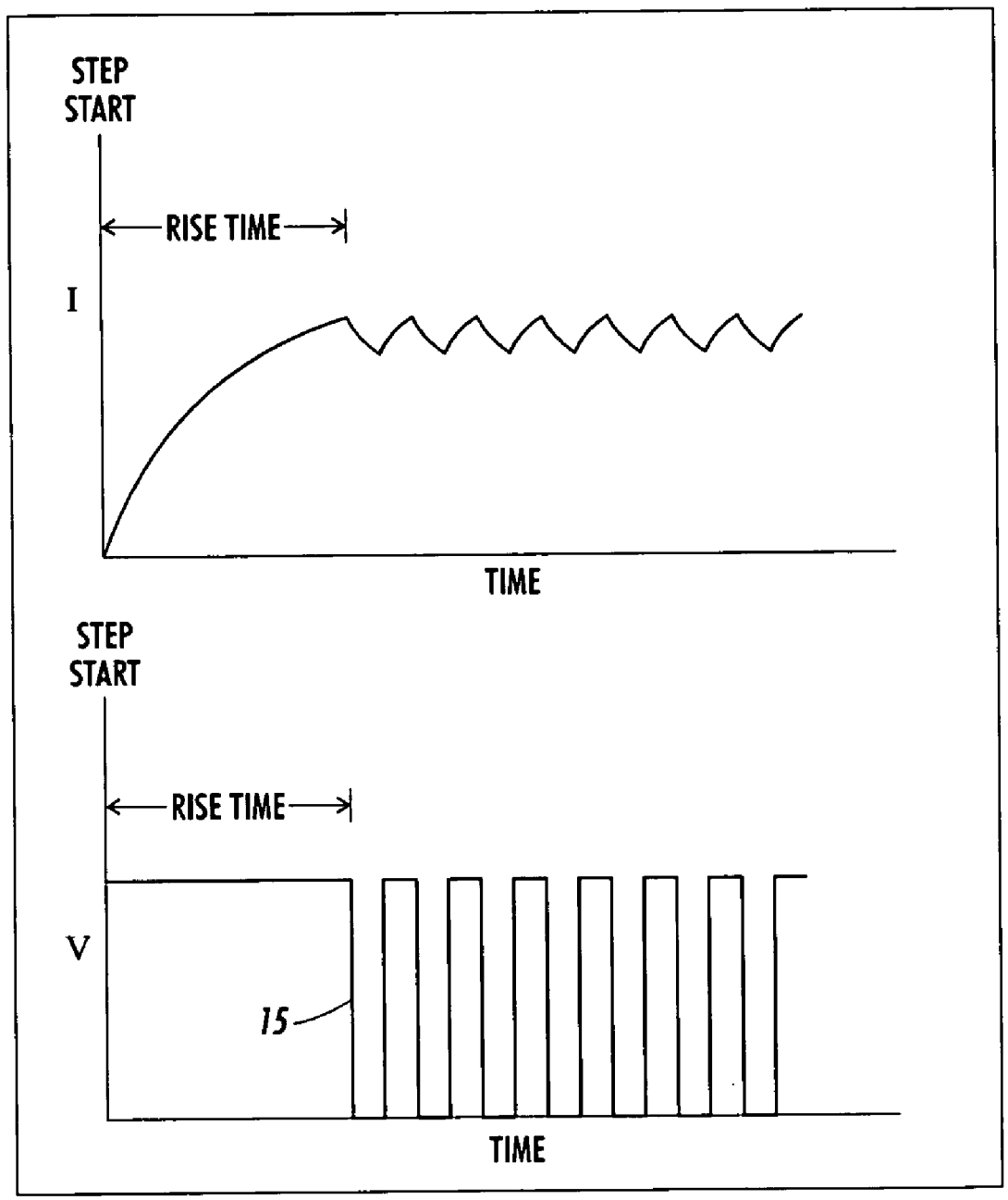
FIG. 3 shows graphs plotting exemplary current and voltage waveforms for the electrical power output by a chopping amplifier and applied to a stepper motor incorporated in a motorization system or assembly embodying aspects of the present inventive subject matter.

Under normal operating conditions, for each step the stepper motor 11 is driven to take, the amplifier 12 supplies and/or energizes the motor 11 with electric power to thereby drive the same such that when the power is supplied an associated current I and voltage V is generated and/or applied to the motor 11. When the electrical power is supplied, the current I output by the amplifier 12 and applied to the motor 11 rises over time from substantially zero initially toward a reference level. Suitably, the reference level corresponds to a current limit or target amperage level, e.g., 2 amperes (AMPS), at which the motor 11 is to be driven. Once the current limit has been reached, the amplifier 12 maintains the effective current threat by chopping or pulse width modulation (PWM). The time it takes the current I to reach the reference level or current limit from initial application is nominally termed the rise time or ramp-up time. During the rise time, the voltage V output by the amplifier 12 and applied to the motor 11 remains substantially steady, e.g., at 30 volts (V). Chopping is induced by cycling the voltage V on and off. FIG. 3 shows a graph of this current and voltage behavior.

Notably, the rise time contains information about the speed of the motor 11. That is to say, the ability to deliver current to the motor 11 is impeded by, what is known as, the back electromagnetic force (EMF) of the motor 12, as well as other factors, e.g., the non-zero inductance of the motor windings, etc. The back EMF produced is proportional to the velocity or speed of the motor 11. Accordingly, the rise time is inversely proportional to the velocity or speed of the motor 11 insomuch as the electrical power output by the amplifier 12 and applied to the motor 11 has to overcome the back EMF. Significantly, if there is no velocity, i.e., the motor 11 is stalled, then no back EMF is generated, in which case the rise time is substantially minimized.

Accordingly, the relationship between rise time and motor velocity is used during diagnostic testing to evaluate the operational state of the motor 11. Suitably, the motor's operational state is evaluated by energizing the motor 11 via the amplifier 12 and observing, monitoring, measuring and/or otherwise determining the rise time. Based upon the rise time, the operational state of the motor 11 is suitably determined by the following logic: if the rise time is above a given first value (representative of normal motor operation), then the motor 11 is operational but rotating at a greater than normal operating speed; if the rise time is at or near the first value, then the motor 11 is operational and rotating at a normal operating speed; if the rise time is less than the first value but greater than a minimum threshold value, then the motor 11 is operational but rotating at a less than normal operating speed; and, if the rise time is at or below the minimum threshold value, then the motor 11 is stalled. Suitably, the first and minimum threshold values are determined and/or set based upon empirical information and/or data related to the particular motor 11 and/or its back EMF characteristics. It is to be appreciated that the stepper motor 11 is optionally unipolar or bipolar having two or four coils or phases. Suitably, however only one coil or phase is monitored. Of course, other types of stepper motors are also contemplated.

With particular reference to FIG. 1, a start trigger 14 is employed to signal the amplifier 12 to start a step, i.e., to energize the motor 11. Suitably, a timer 20, e.g., a digital timer or the like, is also started by the start trigger 14 at or near the same time. When the chopping begins a stop trigger stops the timer 20. In this manner, the timer 20 is started and stopped so as to measure the rise time which is then output to an analyzer or analyzing circuit 30 that evaluates and/or otherwise determines the operational state of the motor 11 based on the received rise time, e.g., in accordance with the above logic. Optionally, the analyzing circuit 30 calculates the velocity or speed of the motor 11 as a function of the received rise time.

Suitably, the voltage V is being measured or otherwise monitored and the stop trigger corresponds to the detection of the first falling edge 15 (see FIG. 3). That is to say, the timer 20 is stopped when the voltage V first goes to or near zero after the step has been started. Optionally, a conditioning circuit 16 conditions the detected voltage V prior to inputting it into the timer 20. For example, the conditioning circuit 16 optionally includes a voltage divider acting as a voltage level translator, e.g., to drop the voltage from a 30 V operating range to a 5 V logic range. Alternately, rather than detecting and/or monitoring the voltage V, a current sensor is likewise optionally use to detect when chopping begins.

With particular reference to FIG. 2, a start trigger 14 is again employed to signal the amplifier 12 to start a step, i.e., to energize the motor 11, and to start the timer 20 at or near the same time. In this embodiment, however, the timer 20 is employed to signal an analog-to-digital converter (A/D) 40 to sample the voltage output from the conditioning circuit 16 at a given or set time delay after the timer 20 is started, e.g., after 250 microseconds ($\mu$s). The condition circuit 16 in this embodiment suitably includes a voltage divider and a resistor-capacitor (RC) filter or similar low-pass filter. Suitably, the conditioning circuit 16 is configured and the time delay selected such that the sampled voltage is substantially proportional to the rise time. The time delay is optionally selected to correspond to the point where a voltage difference is most pronounced between a stalled motor and a normally operating motor, e.g., as determined from empirical evidence. Suitably, the time delay is such that the voltage is scheduled to be sample by the A/D 40 at or near the time when chopping would start if the motor 11 were operating normally.

The voltage sampled by the A/D 40 is then output to the analyzer or analyzing circuit 30 which in turn determines the operational state of the motor 11 therefrom. For example, if the sampled voltage is at or below a threshold level, e.g., 500 millivolts (mV), the motor 11 is identified as stall, otherwise if above the threshold level, the motor 11 is identified as running. Again, the threshold level is suitably determined and/or set based upon empirical information and/or data.

Optionally, as opposed to measuring the entire rise time, it is to be appreciated that the reference level for diagnostic purposes may be set lower than the operational current limit so as to measure some portion of the rise time. Additionally, evaluation of the operational state of the motor 11 may include only detection of stalling, only detection of motor speed, or both. For example, if the current I reaches some arbitrary reference level too soon after a step is initiated, then the motor 11 is optionally identified as stalled immediately. Note also, that prior to diagnostic testing, the motor 11 is optionally first brought up to normal operating speed, or such actions taken as would otherwise do so under normal operating conditions.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via circuitry, hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present inventive subject matter has been described with reference to preferred embodiments. Obviously, modifications and alterations will occur to others upon reading and understanding the specification. It is intended that the invention be construed as including all such modifications and alterations insofar as they come within the scope of the appended claims or the equivalents thereof.

What is claimed is:

1. A method for detecting a state of an electric motor comprising:
   (a) energizing the motor with electrical power such that an associated current applied to the electric motor rises over time toward a reference level;
   (b) determining an amount of time that elapses between when the motor is energized and the reference level is reached; and,
   (c) evaluating a state of the motor based upon the determined amount of time, said evaluating including determining a speed of the motor based upon the determined amount of time.

2. The method of claim 1, wherein the reference level is a current at which the motor is to be operated.

3. The method of claim 1, wherein step (c) comprises: determining that the motor is stalled when the amount of time is less than a threshold value.

4. The method of claim 1, wherein step (b) comprises: measuring the amount of time that elapses.

5. A method for detecting an operational state of an electric motor comprising:
   (a) supplying electrical power to the motor, said electrical power having a current waveform and a voltage waveform, wherein in an initial rise time period that starts at a time the electrical power is supplied to the motor, the current waveform rises toward a reference level and the voltage waveform remains substantially steady, and in a chopping time period following the rise time period the voltage waveform is cycled on and off and the current waveform rises and falls accordingly;
   (b) monitoring the voltage waveform through a low-pass filter and sampling a voltage therefrom after a selected delay from the start of the initial rise time period; and,
   (c) determining an operational state of the motor from the monitoring of the voltage waveform.

6. The method of claim 5, wherein step (c) comprises: identifying the motor as stalled when the sampled voltage is below a threshold level.

7. A motorization assembly comprising:
   an electric motor;
   an amplifier that selectively supplies the motor with electric power to thereby drive the same, such that when the power is supplied an associated current is generated that rises over time toward a reference level;
   detection means for determining an amount of time that elapses between when electrical power is supplied and when the reference level is reached by the current, said detection means including a circuit that produces a voltage proportional to the amount of time that elapses; and,
   analyzing means for evaluating a state of the motor based on the determination of the detection means.

8. The motorization assembly of claim 7, wherein the amplifier is a chopper amplifier.

9. The motorization assembly of claim 7, wherein the electric motor is a stepper motor.

10. A motorization assembly comprising:
    an electric motor;
    an amplifier that selectively supplies the motor with electric power to thereby drive the same, such that when the power is supplied an associated current is generated that rises over time toward a reference level;
    detection means for determining an amount of time that elapses between when electrical power is supplied and when the reference level is reached by the current; and,
    analyzing means for evaluating a state of the motor based on the determination of the detection means, said analyzing means determining a speed of the motor.

11. The motorization assembly of claim 10, wherein the detection means includes:
    a timer that measure the amount of time that elapses.

12. The motorization assembly of claim 7, wherein the analyzing means determines if the motor is stalled.

13. A motorized system comprising:
    an electric motor;
    an amplifier that selectively supplies the motor with electric power to thereby drive the same, such that when the power is supplied an associated current is generated that rises over time toward a reference level;
    detection means for monitoring the supplied electrical power, said detection means including a conditioning circuit through which a voltage associated with the supplied electrical power is sampled at a selected time delay after the electrical power is initially supplied, wherein the conditioning circuit is configured and the time delay selected so that the sampled voltage is below a threshold level when the motor is stalled; and,
    analyzing means for evaluating a state of the motor based on the monitoring of the detection means.

* * * * *